(12) United States Patent
Komori

(10) Patent No.: US 7,854,990 B2
(45) Date of Patent: Dec. 21, 2010

(54) SHEET-SHAPED ADHESIVE AND LAMINATE PREPARED BY USING THE SAME

(75) Inventor: Yushi Komori, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 566 days.

(21) Appl. No.: 10/599,288

(22) PCT Filed: Mar. 22, 2005

(86) PCT No.: PCT/JP2005/005639

§ 371 (c)(1),
(2), (4) Date: Mar. 20, 2008

(87) PCT Pub. No.: WO2005/090504

PCT Pub. Date: Sep. 29, 2005

(65) Prior Publication Data

US 2008/0193750 A1    Aug. 14, 2008

(30) Foreign Application Priority Data

Mar. 23, 2004 (JP) ............................. 2004-085144
May 7, 2004 (JP) ............................. 2004-138405
Aug. 31, 2004 (JP) ............................. 2004-253487

(51) Int. Cl.
*B32B 7/12* (2006.01)
*C08F 220/10* (2006.01)

(52) U.S. Cl. ..................... 428/354; 526/329

(58) Field of Classification Search ................. 428/354
See application file for complete search history.

(56) References Cited

FOREIGN PATENT DOCUMENTS

| JP | 08-026787 A | 1/1996 |
| JP | 10098206 A | 4/1998 |
| JP | 2001-031937 A | 2/2001 |
| JP | 2001031937 A | * 2/2001 |
| JP | 2001-310418 A | 11/2001 |
| JP | 2003-252658 A | 9/2003 |

OTHER PUBLICATIONS

Translation of JP2001031937, Feb. 2001.*
Supplementary European Search Report, corresponding to European Patent Application No. 05721566.7, dated Jul. 28, 2010.

* cited by examiner

*Primary Examiner*—Ling-Siu Choi
*Assistant Examiner*—Hui Chin
(74) *Attorney, Agent, or Firm*—Sughrue Mion, PLLC

(57) ABSTRACT

A sheet-shaped adhesive comprising ethylene-vinyl acetate copolymer and organic peroxide contained therein, wherein the organic peroxide is peroxy carbonate having a formula I or II:

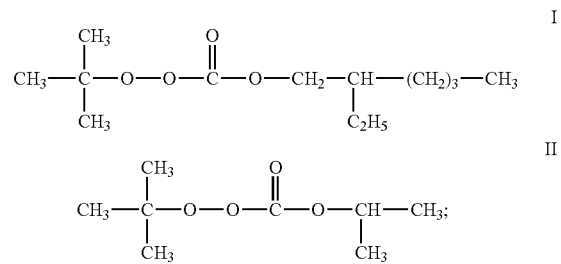

and a laminate prepared by using the adhesive. The sheet-shaped adhesive is useful as a transparent adhesive layer used in the preparation of a film-reinforced glass and a laminated glass which are free from environmental pollution and have excellent penetration resistance.

5 Claims, 1 Drawing Sheet

SHEET-SHAPED ADHESIVE AND LAMINATE PREPARED BY USING THE SAME

BACKGROUND OF INVENTION

1. Field of the Invention

The present invention relates to a sheet-shaped adhesive useful as a transparent adhesive layer used in the preparation of a film-reinforced glass or a laminated glass which has excellent impact resistance and penetration resistance (resistance to passing through) and is effective in prevention of crimes, and which is used in an automobile, a railway vehicle, a building and a showcase, and laminates such as a film-reinforced glass and a laminated glass prepared by using the adhesive.

2. Description of the Related Art

As a glass used in automobile, especially windshield, a laminated glass having a structure that two glass plates are bonded through a transparent adhesive layer (intermediate layer) is generally employed. The transparent adhesive layer is, for example, composed of PVB (polyvinyl butyral) or EVA (ethylene-vinyl acetate), and the use of the transparent adhesive layer enhances penetration resistance of the laminated glass. If external impact is given to the laminated glass, the transparent adhesive layer prevents the glass broken by the impact from scattering because the layer adheres to pieces of the broken glass. Even if the laminated glass for automobile is destroyed for the purpose of robbery or invasion, the window of the laminated glass cannot be opened. Hence, the laminated glass is useful as glass for prevention of crimes. The laminated glass is, for example, described in JP2002-187746A.

In contrast, side windows (side glasses) such as door glass and a glass inserted in window in automobile are scarcely destroyed due to traffic accident, and therefore the glasses do not need such excellent penetration resistance as the above-mentioned laminated glass has. As a result, for the door glass, one glass plate consisting of slightly reinforcing glass has been employed. However, in case only such a glass plate is used in the door glass, the use brings about the following disadvantages:

(1) the glass is poor in impact resistance and penetration resistance (passing through resistance) compared with the laminated glass;

(2) if the glass is destroyed for the purpose of robbery or invasion, it turns into many pieces of the glass to permit window to open.

Therefore, it is also now under investigation to use a glass having characteristics of the laminated glass for the side window of an automobile (e.g. a door glass or inserted glass).

As the laminated glass, especially the door glass of automobile, JP2002-046217A and JP2002-068785A describe a film-reinforced glass in which a plastic film is superposed on a glass plate through a transparent adhesive layer.

Hence, the transparent adhesive layer (i.e., sheet-shaped adhesive) having function that bonds two glass plates to each other or a glass plate (for film-reinforced glass) to a plastic film is required to have excellent adhesion and penetration resistance mentioned above.

It often happens that environmental pollution of chemical materials become problems recently. Hence it is also required not to use the chemical materials bringing about environmental pollution in the transparent adhesive layer. For example, JP2002-046217A and JP2002-068785A use 1,1-bis(t-butylperoxy)-3,3,5-trimethylcyclohexane as crosslinker (organic peroxide) for cross-linking ethylene-vinyl acetate copolymer in Example. The crosslinker cross-links the ethylene-vinyl acetate copolymer for relatively short time to bring about a sheet having excellent adhesion properties and penetration resistance.

SUMMARY OF THE INVENTION

The organic peroxide, 1,1-bis(t-butylperoxy)-3,3,5-trimethylcyclohexane, is however reported to be accumulated in the organism body, and therefore its use is possibly prohibited due to Law Concerning the Examination and Regulation of Manufacture etc. of Chemical Substances. On the other hand, the laminates such as laminated glass is required to have further improved penetration resistance in view of safety on smashup.

Thus it is necessary to find organic peroxide which has a basic structure different from the above-mentioned organic peroxide (it is considered that there is problem in existence of cyclohexane ring), is not the compounds designated by the Law, and cross-links EVA to form a sheet having excellent adhesion and penetration resistance, particularly enhanced penetration resistance than ever before.

In view of the above viewpoints, the object of the present invention is to provide a sheet-shaped adhesive (i.e., transparent adhesive layer) useful for the preparation of a film-reinforced glass or a laminated glass which is free from environmental pollution.

Further, the object of the present invention is to provide a sheet-shaped adhesive useful for the preparation of a film-reinforced glass or a laminated glass having excellent penetration resistance and high transparency.

Furthermore, the object of the present invention is to provide a laminate useful as a film-reinforced glass or a laminated glass having excellent penetration resistance and high transparency.

The above object is attained by the present invention, i.e., a sheet-shaped adhesive comprising ethylene-vinyl acetate copolymer and organic peroxide contained therein, wherein the organic peroxide is peroxy carbonate having a formula I or II:

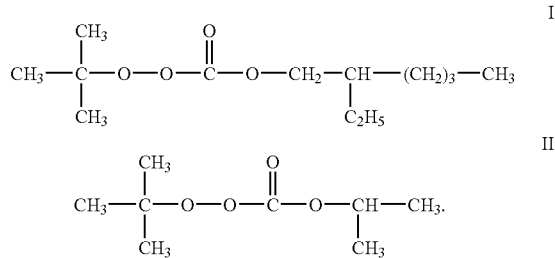

Particularly preferred is the compound of the formula I because high cross-linking rate, excellent adhesion and enhanced penetration resistance can be easily obtained.

The sheet-shaped adhesive preferably has cure torque of 90 to 115 N·cm, especially 95 to 110 N·cm. The cure torque is determined by heating a bulk material having 5 cm$_3$ to 130° C., and starting measurement of a cure torque and measuring a cure torque after 30 minutes (from starting time point of the measurement), the cure torque being determined according to JIS K 6300-2 (2001). The sheet-shaped adhesive has excellent penetration resistance. Further, the sheet-shaped adhesive preferably has the following properties; i.e., in case a laminate consisting of two glass plates and the sheet-shaped adhesive therebetween is subjected to a penetration test according to JIS R 3205 (1985), the outside glass plate of the laminate is penetrated through but the inside glass plate and the sheet-shaped adhesive are not penetrated through. Furthermore it has been revealed by the study of the inventor that it is preferred to slightly decrease the adhesive strength and relatively increase the cure torque (hardness) in order to obtain excellent penetration resistance. Hence, the sheet-shaped adhesive of the invention preferably has the cure torque of the above-mentioned range and the adhesive strength of 9.8 to 15N/cm.

The sheet-shaped adhesive (transparent adhesive layer) preferably comprises ethylene-vinyl acetate copolymer, organic peroxide and triallyl isocyanurate or triallyl cyanurate, whereby high curing rate, excellent adhesion and improved penetration resistance can be easily obtained. The organic peroxide is generally contained in the amount of 0.5 to 5.0 part by weight, preferably 1.0 to 3.0 part by weight, especially 2.2 to 3.0 part by weight, based on 100 parts by weight of the ethylene-vinyl acetate copolymer. The triallyl (iso)cyanurate is generally contained in the amount of 1.0 to 3.0 part by weight, preferably 1.8 to 2.2 part by weight, based on 100 parts by weight of the ethylene-vinyl acetate copolymer. Further the ratio of the organic peroxide to triallyl(iso)cyanurate is generally in the range of 60:40 to 40:60, preferably 60:40 to 52:48 (organic peroxide:triallyl (iso)cyanurate). Thus both of improved penetration resistance and transparency (lowered haze) can be easily obtained.

A vinyl acetate recurring unit of the ethylene-vinyl acetate copolymer is generally contained in the amount of 20 to 35% by weight, preferably 22 to 30% by weight, especially 24 to 28% by weight based on the amount (100 parts by weight) of the ethylene-vinyl acetate copolymer.

The sheet-shaped adhesive of the invention is preferably obtained by subjecting the ethylene-vinyl acetate copolymer and the organic peroxide (if necessary crosslinking auxiliary such as triallyl(iso)cyanurate) to a calendaring process; or by subjecting a liquid comprising the ethylene-vinyl acetate copolymer and organic peroxide (if necessary crosslinking auxiliary) to a coating method or application method.

The laminate of the invention comprises two transparent substrates and the sheet-shaped adhesive between the two transparent substrates, as mentioned above, the transparent substrates and the adhesive being integrated by curing of the adhesive. In the laminate, it is preferred that one of the two transparent substrates preferably is a glass plate and the other is a plastic film; or that both the two transparent substrates are glass plates. The laminate having two glass plates as the two transparent substrates preferably has reduced haze.

Further, in the sheet-shaped adhesive, it is preferred that its haze little changes even if its thickness increases.

In the laminate, it is preferred that the ratio of haze ($H_2$) in case of the adhesive having thickness of 1,600 μm to haze ($H_1$) in case of the adhesive having thickness of 400 μm is in the range of 200 to 290% independently of the cooling condition in the preparation of the adhesive. Thus, the laminate comes to have such haze as scarcely changes with change (fluctuation) of the thickness.

The haze is determined according to JIS 7105 (1981).

EFFECT OF THE INVENTION

The crosslinker (organic peroxide) used in the sheet-shaped adhesive of the invention is selected from known organic peroxides so as to be free from environmental pollution, and to have excellent adhesion and penetration resistance as well as good productivity as a transparent adhesive layer for a film-reinforced glass or a laminated glass. Particularly, the sheet-shaped adhesive is capable of acquiring lowered haze independently of change of the thickness by using the organic peroxide and combining it with crosslinking auxiliary in the specific ratio. Hence, the crosslinked sheet-shaped adhesive of the invention is free from environmental pollution and has excellent penetration resistance and high transparency. Similarly, the laminate of the invention such as a film-reinforced glass or a laminated glass, which is prepared by using the adhesive, is free from environmental pollution and has excellent penetration resistance and high transparency.

DETAILED DESCRIPTION OF THE INVENTION

A sheet-shaped adhesive according to the invention is a sheet basically consisting of ethylene-vinyl acetate copolymer and the specific organic peroxide contained therein, and is particularly excellent as a transparent adhesive layer of a laminate such as a film-reinforced glass or a laminated glass.

The organic peroxide is peroxy carbonate having a formula I or II:

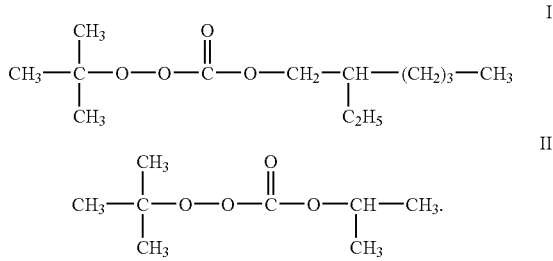

By using the specific organic peroxide, the adhesive easily acquires high cross-linking rate, excellent adhesion, enhanced penetration resistance and high transparency as well. Particularly the compound of formula I is preferred.

In contrast to a conventional organic peroxide of 1,1-bis(t-butylperoxy)-3,3,5-trimethylcyclohexane, which is usually used to obtain excellent characteristics, the compound of the formula I or II does not have such cyclic structure as the conventional organic peroxide while is linear aliphatic system and carbonate system, and therefore the compound is considered to be difficultly accumulated in the organism body.

The sheet-shaped adhesive (transparent adhesive layer) preferably comprises ethylene-vinyl acetate copolymer, organic peroxide and further triallyl isocyanurate or triallyl cyanurate in order to cross-link the ethylene-vinyl acetate copolymer together with the organic peroxide and triallyl (iso)cyanurate, whereby high curing rate, excellent adhesion and improved penetration resistance and high transparency (lowered haze) as well can be easily obtained. In this case, the ratio of the organic peroxide to triallyl (iso)cyanurate is preferably in the range of 60:40 to 40:60, especially 60:40 to 52:48 (organic peroxide:triallyl(iso)cyanurate).

The laminate (generally transparent laminate) of the invention is a film-reinforced glass or a laminated glass obtained by superposing, on a glass plate, a transparent adhesive layer of the sheet-shaped adhesive and one glass plate or one plastic film in order.

Figure 1:
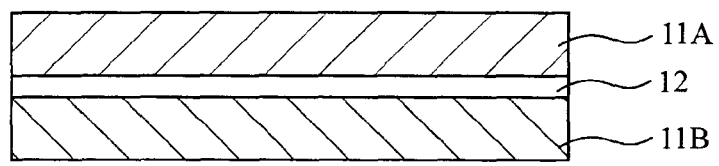
FIG. 1 is a section view showing one example of embodiments of the laminate according to the invention.

An example of embodiments of the laminate of the invention is shown in FIG. 1. The laminate is obtained by inserting the transparent adhesive layer 12 between a glass plate 11A and a glass plate 11B, and cross-linking and uniting them, the transparent adhesive layer 12 basically consisting of ethylene-vinyl acetate copolymer containing the organic peroxide of the formula I or II. The glass plate 11B can be changed into a plastic film. The former can be referred to as a laminated glass and the latter as a film-reinforced glass. Both the glass plates 11A and 11B can be changed into plastic films In the laminate, the two glass plates or the glass plate and plastic film are strongly bonded to each other because of use of the sheet-shaped adhesive as the transparent adhesive layer, whereby the composite is scarcely penetrated through if it suffers from large impact. Hence the composite shows excellent penetration resistance. Further, the organic peroxide of the invention shows high curing rate that is not inferior to the conventional peroxide, and can be easily prepared.

Further the organic peroxide of the invention is free from environmental pollution, and the laminate of the invention obtained by using the peroxide is free from environmental pollution. Hence, the laminate of the invention has high transparency and lowered haze. In more detail, the haze of the laminate can be greatly lowered by particularly using the organic peroxide in the amount as mentioned later and combining the organic peroxide and triallyl isocyanurate (TAIC) or triallyl cyanurate in the ration as mentioned above, and further the laminate can acquire relatively uniform haze value almost independently of variation of the thickness of the adhesive.

The laminate of the invention having a plastic film on one side can be designed so as to have appropriate performances such as impact resistance, penetration resistance and transparency, whereby the laminate can be used, for example, as a window glass in various vehicles and building, and as a glass in show-window and showcase.

On the other hand, the laminate of the invention having glass plates on both sides can be designed so as to have greatly improved impact resistance and penetration resistance, whereby the laminate can be used, for example, in various uses including a laminated glass.

Further, in case antireflective properties are given to the plastic film that, the resultant laminate can acquire properties of preventing generation of reflected image and reflection of a fluorescent lamp as well. In addition to the properties, the properties such as improved scratch-resistance, fog resistance, conductivity and antistatic properties, and high gloss, improved solvent resistance, and low permeability can be given to the laminate.

In the laminate of the invention having a plastic film on one side, which is, for example, used in a side window or inserted glass of automobile, the transparent adhesive layer generally has a thickness of 0.1 to 1.0 mm, preferably 0.2 to 0.6 mm because such large thickness as a front glass is not required. Similarly, the thickness of the plastic film generally is in the range of 0.02 to 2 mm, preferably 0.02 to 1.2 mm. The thickness of the transparent adhesive layer or plastic film can be varied depending on where the reinforced glass is used The glass plate of the invention generally comprises silicate glass. The thickness of the glass plate is varied depending on where the reinforced glass of the invention is used. For example, in case the film-reinforced glass is used as a side window or inserted glass of automobile, the glass plate need not have the thickness of windshield and therefore its thickness is generally in the range of 1 to 10 mm, preferably 0.3 to 5 mm. The glass plate is tempered in heat or chemical resistance.

In the laminate of the invention having glass plates on both sides, which is suitable for a front glass of automobile, the thickness of the glass plate generally is in the range of 0.5 to 10 mm, preferably 1 to 8 mm.

Ethylene-vinyl acetate copolymer (EVA) is used as organic resin of the sheet-shaped adhesive (transparent adhesive layer). Further, polyvinyl acetal resin (e.g., polyvinyl formal, polyvinyl butyral (PVB), modified PVB) and/or polyvinyl chloride can be secondarily used. PVB is preferred.

In EVA used in the transparent adhesive layer, the content of vinyl acetate recurring unit preferably is in the range of 15 to 40% by weight, preferably 20 to 35% by weight, more preferably 22 to 30% by weight, especially 24 to 28% by weight. When the content is less than 15% by weight, the resin cured at high temperature does not show satisfactory transparency. On the other hand, when the content is more than 40% by weight, the resin is apt not to satisfy impact resistance and penetration resistance required in the glass for prevention of crimes.

An resin composition used in the transparent adhesive layer (sheet-shaped adhesive) comprises EVA and the organic peroxide of the formula I or II, and further can contain various additives such as a crosslinking auxiliary, a plasticizer, and an adhesion promoter, if necessary.

The organic peroxide is generally contained in the amount of 0.5 to 5.0 part by weight, preferably 1.0 to 3.0 part by weight, especially 2.2 to 3.0 part by weight, based on 100 parts by weight of EVA. Thus the laminate that is free from environmental pollution and has excellent adhesion and penetration resistance can be easily obtained. Further, the triallyl (iso)cyanurate is generally contained in the amount of 0.5 to 5.0 part by weight, preferably 1.0 to 3.0 part by weight, especially 1.8 to 2.2 part by weight based on 100 parts by weight of EVA. Thereby, the adhesion and penetration resistance can be further enhanced. Triallyl(iso)cyanurate means triallyl cyanurate and triallyl isocyanurate, and triallyl isocyanurate is especially preferred. Further the ratio of the organic peroxide to triallyl (iso)cyanurate is generally in the range of 60:40 to 40:60, preferably 60:40 to 52:48 (organic peroxide: triallyl(iso)cyanurate). Thereby, improved penetration resistance can be easily obtained. The thickness of the transparent adhesive layer is generally in the range of 10 to 2,000 µm, preferably 10 to 1,000 µm, especially 20 to 500 µm.

Though the laminate of the invention has excellent transparency, the haze of laminate is particularly lowered by using 2.0 to 3.0 parts by weight of organic peroxide and combining the organic peroxide with triallyl (iso)cyanurate at the ratio of the organic peroxide to triallyl (iso)cyanurate of 60:40 to 52:48. Further, a mixture of organic peroxide and triallyl(iso) cyanurate satisfying the above-mentioned amount and ratio is in the form of liquid, and therefore can be easily added to EVA to uniformly disperse these in EVA. Moreover, it is considered that the mixture brings about greatly increased crosslinking points to prevent crystallization of the resultant crosslinked EVA whereby the haze can be greatly reduced.

For example, the laminate having two glass plates as transparent substrates can be designed to have haze (value) of 0.2 to 0.6. Further, it is also possible that the ratio of haze ($H_2$) in case of the adhesive having thickness of 1,600 µm to haze ($H_1$) in case of the adhesive having thickness of 400 µm is in the range of 200 to 290%, preferably 200 to 260%, independently of the cooling condition in the preparation of the sheet-shaped adhesive. In order to obtain the above-mentioned low haze, it is required to use the above-mentioned composition and make an appropriate choice of various processes for the preparation of the laminate. For example, it is preferred to optimize heating methods and heating conditions (e.g., temperature) of the mixture of EVA, etc. Generally it is preferred that cooling after heating process is rapidly carried out to obtain the low haze.

As the plasticizer, polybasic acid esters and polyhydric alcohol esters are generally employed although the plasticizer can be used without any restriction. Examples of the esters include dioctyl phthalate, dihexyladipate, triethylene glycol-di-2-ethylbutylate, butyl sebacate, tetraethylene glycol heptanoate and triethylene glycol dipelargonate. The plasticizer can be used singly, or in combination of two or more kinds. The content of the plasticizer is generally in an amount of not more than 5 parts by weight based on 100 parts by weight of EVA.

In the invention, the compound of the formula I or II is used as the organic peroxide. However, any materials that can be decomposed at a temperature of not less than 100° C. to generate radical(s) can be also secondarily employed. The organic peroxide is selected in the consideration of film-forming temperature, condition for preparing the composition, curing (bonding) temperature, heat resistance of body to be bonded, storage stability. Especially, preferred are those having a decomposition temperature of not less than 70° C. in a half-life of 10 hours.

Examples of the organic peroxide include 2,5-dimethylhexane-2,5-dihydroperoxide, 2,5-dimethyl-2,5-(t-butylperoxy)hexane-3-di-t-butylperoxide, t-butylcumyl peroxide, 2,5-dimethyl-2,5-di(t-butylperoxy)hexane, dicumyl peroxide, α,α'-bis(t-butylperoxyisopropyl)benzene, n-butyl-4,4-bis(t-butylperoxy)valerate, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethylhexyl-2,5-bisperoxybenzoate, t-butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, m-toluoyl peroxide, t-butylperoxyisobutylate and 2,4-dichlorobenzoyl peroxide.

The transparent adhesive layer preferably contains acryloxy group-containing compounds, methacryloxy group-containing compounds and/or epoxy group-containing compounds for improvement or adjustment of various properties of the layer (e.g., mechanical strength, adhesive property (adhesion), optical characteristics such as transparency, heat resistance, light-resistance, cross-linking rate), particularly for improvement mechanical strength.

Examples of the acryloxy and methacryloxy group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxypropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol.

Example of the amide includes diacetone acrylamide.

Examples of polyfunctional compounds (cross-linking auxiliaries) include esters of plural acrylic acids or methacrylic acids with polyhydric alcohol such as glycerol, trimethylol propane or pentaerythritol; and further triallyl cyanurate and triallyl isocyanurate.

Examples of the epoxy group containing compounds include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)$_5$glycidyl ether, p-tert-butylphenyl glycidyl ether, diglycidyl adipate, diglycidyl phthalate, glycidyl methacrylate and butyl glycidyl ether.

In the invention, a silane coupling agent can be used for enhancing the adhesive strength between the transparent adhesive layer and the glass plate or plastic film.

Examples of the silane coupling agent include γ-chloropropylmethoxysilane, vinyltriethoxysilane, vinyl-tris(β-methoxyethoxy)silane, γ-methacryloxypropylmethoxysilane, vinyl-triacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agents can be used singly, or in combination of two or more kinds. The content of the silane coupling agent is preferably in an amount of not more than 5 weight by part based on 100 parts by weight of EVA.

The sheet-shaped adhesive (transparent adhesive layer) of the invention can be prepared, for example, by subjecting a composition including EVA, organic peroxide, etc., to a conventional molding process such as extrusion molding or calendaring to form a sheet-shaped material. Otherwise, the sheet-shaped adhesive can be also obtained by dissolving the composition including EVA, organic peroxide, etc., in a solvent to form a solution and coating and drying the solution on an appropriate support by means of an appropriate coater to form a coated layer.

Figure 2:
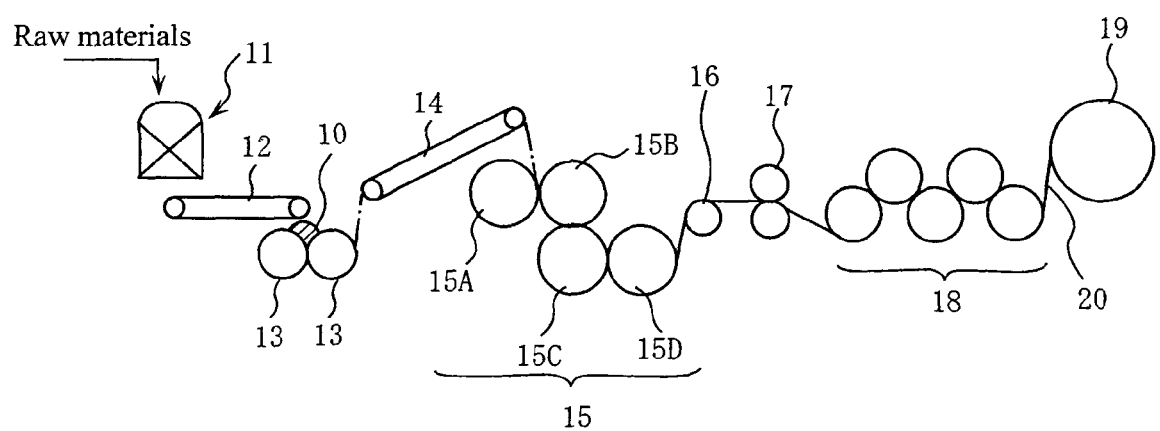
FIG. 2 is a section view showing one example of processes for the preparation of the sheet-shaped adhesive according to the invention by means of calendaring process.

An example of processes for the preparation of the sheet-shaped adhesive of the invention by means of calendaring process is shown in FIG. 2. A composition (raw materials) including EVA, organic peroxide, etc., is introduced into a kneader 11 and kneaded, and then the kneaded composition 10 is transported by a conveyer 12 to be introduced into a mixing roll 13. The kneaded composition 10 molded in the form of sheet by the mixing roll 13 is transformed by a conveyer 14, and smoothed by calendaring rolls 15 (a first roll 15A, a second roll 15B, a third roll 15C, a forth roll 15D), and then the resultant smoothed sheet is taken out by a take-off roll 16. Thereafter, the surface of the smoothed sheet is embossed by an emboss roll 17, and the embossed sheet is cooled by five cooling rolls 18 to prepare a sheet 20, which is rewound around a winder 19. The embossing process is carried out if necessary.

In case the sheet-shaped adhesive (transparent adhesive layer), that is the sheet obtained as above, is used for the preparation of the laminate, the adhesive is generally cross-linked by heating at 100 to 150° C. (especially approx. 130° C.) for 10 minutes to one hour. In the preparation of the laminate, the above cross-linking is carried out, for example, by degassing the sheet inserted between two transparent substrates (generally glass plates), and preliminarily bonding them (substrate/sheet/substrate) to each other under pressure at 80 to 120° C., and then heated at 100 to 150° C. (especially approx. 130° C.) for 10 minutes to one hour. The heating is preferably carried out, for example, at 130° C. for 30 minutes (atmosphere temperature). The crosslinked laminate is generally cooled at room temperature. The cooling is preferably conducted rapidly.

Examples of the plastic film used in the invention include polyethylene terephthalate (PET) film, polyethylene naphthalate (PEN) film or polyethylene butyrate film. Especially preferred is PET film.

A hard coat layer can be provided on the plastic film to enhance scratch resistance of surface. As a resin for forming the hard coat layer, UV (ultraviolet) curable resin or thermosetting resin can be generally employed. The thickness of the hard coat layer is generally in the range of 1 to 50 μm, preferably 3 to 20 μm.

Known UV (ultraviolet) curable resin can be employed in the invention. Further, any low molecular and polyfunctional resins suitable for forming a hard coat layer are usable without restriction. Examples of materials for the UV curable resin include oligomers such as urethane oligomer, polyester oligomer and epoxy oligomer which have plural ethylenically double bonds; and mono- or polyfunctional oligomers (monomers) such as pentaerythritol tetraacrylate (PETA), pentaerythritol tetramethacrylate and dipentaerythritol hexaacrylate (DPEHA). The UV curable resin generally consists of oligomer, photoinitiator and if necessary reactive diluent (monomer), and further various additives can be used. Examples of the reactive diluents include those mentioned in acryloxy group-containing compounds, methacryloxy group-containing compounds and/or epoxy group-containing compounds used as materials of the transparent adhesive layer. Known photoinitiators are can be used in the invention.

The oligomers, reactive diluents and photoinitiators can be each used singly, or in combination of two or more kinds. The content of the diluent is preferably in an amount of 0.1 to 10 part by weight, particularly 0.5 to 5 parts by weight based on 100 parts by weight of UV curable resin. The content of the photoinitiator is preferably in an amount of not more than 5 parts by weight based on 100 parts by weight of UV curable resin.

Examples of the thermosetting resin include reactive acrylic resin, melamine resin, epoxy resin. The above-mentioned UV curable resin can be used as thermosetting resin.

In case a hard coat layer is formed by using UV curable resin, UV curable resin itself or a solution having an appropriate resin concentration obtained by diluting UV curable resin with a solvent is coated on an appropriate film by an appropriate coater, and if desired the coated layer is dried, and then the coated layer is exposed to a UV rays of a UV lamp directly or through a strippable sheet for a few seconds to a few minutes to form a hard coat layer. In the case of using the strippable sheet, after degassing under vacuum the coated layer is exposed. Examples of the UV lamp include high-pressure, medium-pressure and low-pressure mercury lamps, and a metal halide lamp.

In case a hard coat layer is formed by using thermosetting resin, a solution of thermosetting resin in a solvent is coated on an appropriate film by an appropriate coater, and if desired a strippable sheet is provided on the coated layer, and then the coated layer is, after degassing by a laminator, cured by heating and heat-bonded under pressure. When the strippable sheet is not used, it is preferred that before heat-bonding, the coated layer is dried for approx. 60 seconds to vaporize the solvent until the coated layer comes to be tacky free. When the strippable sheet is used, too, it is preferred that the coated layer is dried a little and then the strippable sheet is provided.

A transparent conductive layer comprising metal and/or metal oxide may be formed on the glass plate of the laminate of the invention.

The laminate of the invention can be prepared by superposing on one glass plate a sheet-shaped adhesive and one glass plate or plastic film to form a sandwich structured composite, degassing the composite and then pressing the composite under heating. If desired, thereafter a hard cot layer is formed on the plastic film. Otherwise, a liquid for hard coat layer is coated on the sandwich structured composite and cured by UV radiation, and then pressed under heating. After these procedures, the above-mentioned cross-linking process is carried out.

A barrier layer can be formed on the side face of the resultant laminate (especially a laminated glass). The barrier layer has generally a thickness of 0.1 to 20 μm, preferably 1 to 10 μm.

The laminate prepared as above can be employed for the following uses: an inserted glass, a side window (door glass) and a rear glass in an automobile; a door glass of a door leaf for passenger to go in or out, a door glass for chamber, and a window glass in a railway vehicle (e.g., corridor train, express train, special train, sleeping car), a window glass and a door glass in constructions such as building, a showcase for display, and a glass of show window. The laminate is preferably employed as a side window, inserted glass for side window and rear glass in an automobile, and a window glass in a railway vehicle, especially as a side window and inserted glass for a door glass in an automobile.

The cross-linked (cured) sheet-shaped adhesive of the invention has excellent adhesion and penetration resistance as mentioned above. The penetration resistance can be evaluated as cure torque, which indicates, for example, toughness of the sheet-shaped adhesive. The cure torque is determined by heating a bulk material having 5 $cm_3$ to 130° C., and starting measuring of a cure torque and measuring a cure torque after 30 minutes by using a cure torque meter (IV type; available from JSR Corp.), the cure torque being determined according to JIS K 6300-2 (2001). The sheet-shaped adhesive preferably has cure torque of 90 to 115 N·cm, especially 95 to 110 N·cm, which shows excellent performance compared with conventional adhesive. Further, the sheet-shaped adhesive preferably has the following properties; i.e., in case a laminate consisting of two glass plates and the sheet-shaped adhesive therebetween is subjected to a penetration test according to JIS R 3205 (1985), the outside glass plate of the laminate is penetrated through but the inside glass plate and the sheet-shaped adhesive are not penetrated through.

Furthermore, according to the study of the inventor, it is preferred to slightly decrease the adhesive strength and relatively increase the cure torque (hardness) in order to obtain excellent penetration resistance. Hence, the sheet-shaped adhesive of the invention preferably has the cure torque of the above-mentioned range and the adhesive strength of 9.8 to 15 N/cm, especially 12 to 15 N/cm.

The invention is illustrated in detail using the following Examples.

EXAMPLE

Example 1

Calendaring

Raw materials having the following formulation were processed by calendaring process as shown in FIG. 2 to prepare a sheet-shaped transparent adhesive (thickness: 400 μm). The raw materials were kneaded at 80° C. for 15 minutes, and the calendar rolls had a temperature of 80° C. and the processing rate was 5 m/min.

(Formulation for Forming Sheet-Shaped Adhesive)

| | |
|---|---|
| EVA (content of vinyl acetate: 25 wt. %) | 100 weight parts |
| Crosslinker (t-butylperoxy-2-ethylhexylcarbonate) | 2.5 weight parts |
| Cross-linking auxiliary (triallyl isocyanurate) | 2.0 weight parts |
| Silane coupling agent (3-methacryloxypropyl trimethoxy silane) | 0.5 weight part |

<Preparation of a Laminated Glass>

Two silicate glass plates having thickness of 5 mm, which was preliminarily washed and dried, were prepared as glass plates. The sheet-shaped adhesive was inserted between the two glass plates, and the glass plates having the adhesive was put into a rubber case to be degassed in a vacuum and then preliminary bonded at 110° C. under pressure. The bonded glasses was introduced into an oven and heated at 130° C. for 30 minutes, and then cooled such that the atmosphere temperature is dropped at rate of 20/min. to prepare a laminate (a laminated glass) of the invention.

Example 2

Calendaring

<Preparation of a Laminated Glass>

The sheet-shaped adhesive obtained in Example 1 was inserted between the two glass plates of Example 1, and the glass plates having the adhesive was put into a rubber case to be degassed in a vacuum and then preliminary bonded at 110° C. under pressure. The bonded glasses was introduced into an oven and heated at 130° C. for 30 minutes, and then cooled such that the atmosphere temperature is dropped at rate of 0.4/min. to prepare a laminate (a laminated glass) of the invention.

Example 3

Coating

Two silicate glass plates having thickness of 5 mm, which was preliminarily washed and dried, were prepared as glass plates.

A coating solution of the following formulation for forming a transparent sheet-shaped adhesive was coated on one of the glass plates to form a sheet-shaped transparent adhesive (thickness: 400 µm). Thus a glass plate having transparent sheet-shaped adhesive was prepared.

(Formulation of Coating Solution of Forming Sheet-Shaped Adhesive)

| | |
|---|---|
| EVA (content of vinyl acetate: 25 wt. %) | 100 weight parts |
| Crosslinker (t-butylperoxy-2-ethylhexylcarbonate) | 2.5 weight parts |
| Cross-linking auxiliary (triallyl isocyanurate) | 2.0 weight parts |
| Silane coupling agent (3-methacryloxypropyl trimethoxy silane) | 0.5 weight part |
| Toluene | 400 weight parts |

<Preparation of a Laminated Glass>

The other glass plate was superposed on the transparent sheet-shaped adhesive of the resultant glass plate having transparent sheet-shaped adhesive, and the glass plates having the adhesive was put into a rubber case to be degassed in a vacuum and then preliminary bonded at 110° C. under pressure. The bonded glasses was introduced into an oven and heated at 130° C. for 30 minutes, and then cooled such that the atmosphere temperature is dropped at rate of 20/min. to prepare a laminate (a laminated glass) of the invention.

Example 4

Coating

<Preparation of a Laminated Glass>

The other glass plate of Example 3 was superposed on the transparent sheet-shaped adhesive of the resultant glass plate having transparent sheet-shaped adhesive obtained in Example 3, and the glass plates having the adhesive was put into a rubber case to be degassed in a vacuum and then preliminary bonded at 110° C. under pressure. The bonded glasses was introduced into an oven and heated at 130° C. for 30 minutes, and then cooled such that the atmosphere temperature is dropped at rate of 0.4/min. to prepare a laminate (a laminated glass) of the invention.

Comparison Example 1

Calendaring

The procedures of Example 1 were repeated except for using 2 weight parts of 1,1-bis(t-butylperoxy)-3,3,5-trimethylcyclohexane instead of t-butylperoxy-2-ethylhexylcarbonate as crosslinker.

Comparison Example 2

Calendaring

The procedures of Example 2 were repeated except for using 2 weight parts of 1,1-bis(t-butylperoxy)-3,3,5-trimethylcyclohexane instead of t-butylperoxy-2-ethylhexylcarbonate as crosslinker.

<Evaluation on Laminate and Sheet-Shaped Adhesive>

(Cure Torque)

Bulk materials having 5 $cm_3$ are prepared in the same manner as in Examples 1 to 4 and Comparison Examples 1 and 2. The cure torque is determined by heating each of the bulk materials having 5 $cm_3$ to 130° C., and starting measurement of a cure torque and measuring a cure torque after 30 minutes from the starting point in time by using a cure torque meter (IV type; available from JSR Corp.). The cure torque was determined according to JIS K 6300-2-2001.

(Penetration Resistance)

Transparent laminates (Examples 1 to 4 and Comparison Examples 1 and 2) obtained by inserting the sheet-shaped adhesive between two glass plates are subjected to a penetration test according to JIS R 3205 (1985). Penetration resistance is evaluated as follows:

A: The outside glass plate (impacted plate) of the laminate is passed through but the inside glass plate and the sheet-shaped adhesive are not passed through.

C: The outside glass plate of the laminate is passed through and the inside glass plate and the sheet-shaped adhesive are also passed through.

(Adhesive Strength)

Laminates are prepared in the same manner as in Examples 1 to 4 and Comparison Examples 1 and 2 except for using PET film having thickness of 50 mm. The laminates are cut to prepare test pieces having width of 2.5 cm and length of 10 cm. The test pieces are subjected to measurement of 180° peeling strength between glass plate and adhesive at tensile rate of 100 mm/min. and temperature of 22±5° C. by using a tensile tester. Three test pieces per each Example are measured to report the mean value as the adhesive strength. The measurement is carried out carried out according to JIS K 6854 (1994).

(Haze)

Hazes of the laminates prepared in Examples 1 to 4 and Comparison Examples 1 and 2 are measured according to JIS 7105 (1981). In more detail, haze values of three test pieces of each Example are measured by using Color Computer SM-5 (available from Suga Test Instruments Co., Ltd.). The mean value of the three test pieces is reported as haze.

(Haze Ratio)

Laminates are prepared in the same manner as in Examples 1 to 4 and Comparison Examples 1 and 2 except for changing the thickness of the sheet-shaped adhesive to 400 µm and 1,600 µm. Two hazes of the laminates (400 µm and 1,600 µm) of each Example are obtained in the same manner as above, and their percentage is calculated.

The obtained results are shown in Table 1.

TABLE 1

|  | Example | | | | Co. Ex. 1 | Co. Ex. 2 |
| --- | --- | --- | --- | --- | --- | --- |
|  | Ex. 1 | Ex. 2 | Ex. 3 | Ex. 4 | | |
| (1) Cure torque (N · cm) | 108 | 107 | 107 | 107 | 92 | 93 |
| (2) Penetration resistance | A | A | A | A | C | C |
| (3) Adhesive strength (N/cm) | 13 | 14 | 14 | 13 | 16 | 16 |
| (4) Haze | 0.2 | 0.6 | 0.2 | 0.6 | 0.2 | 0.6 |
| (5) Haze ratio | 230 | 270 | 250 | 290 | 300 | 300 |

The above results apparently show that the sheet-shaped adhesives or laminates of Examples 1-4 according to the invention have increased cure torque, improved penetration resistance and lowered haze, and further indicate little variation of haze. Though they are a little inferior to those of Comparison Example 1 in adhesive strength, they satisfy practical level of adhesive strength and show enhanced penetration resistance.

INDUSTRIAL APPLICABILITY

The sheet-shaped adhesive of the invention is free from environmental pollution and shows improved penetration resistance and transparency, after the cross-linking. Hence, the laminate such as film-reinforced glass or laminated glass prepared by using the sheet-shaped adhesive also is free from environmental pollution shows improved penetration resistance and transparency.

The invention claimed is:

1. A sheet-shaped adhesive comprising ethylene-vinyl acetate copolymer, organic peroxide and triallyl (iso)cyanurate contained therein, wherein the organic peroxide is peroxy carbonate having a formula I or II:

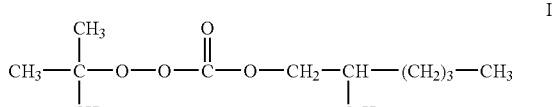

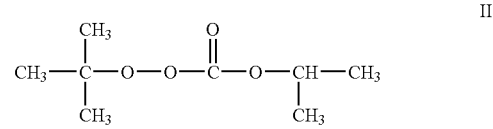

wherein the organic peroxide is contained in the amount of 2.2 to 3.0 parts by weight based on 100 parts by weight of the ethylene-vinyl acetate copolymer and a weight ratio of the organic peroxide to triallyl isocyanurate is in the range of 60:40 to 52:48.

2. A sheet-shaped adhesive as defined in claim 1, which contains triallyl (iso)cyanurate in the amount of 1.0 to 3.0 part by weight based on 100 parts by weight of the ethylene-vinyl acetate copolymer.

3. A sheet-shaped adhesive as defined in claim 1, wherein a vinyl acetate recurring unit of the ethylene-vinyl acetate copolymer is contained in the amount of 20 to 35% by weight based on 100 parts by weight of the ethylene-vinyl acetate copolymer.

4. A sheet-shaped adhesive as defined in claim 1, which is obtained by subjecting the ethylene-vinyl acetate copolymer containing the organic peroxide to a calendaring process.

5. A sheet-shaped adhesive as defined in claim 1, which is obtained by subjecting a liquid comprising the ethylene-vinyl acetate copolymer containing organic peroxide to a coating process.

* * * * *